(12) United States Patent
Peterson et al.

(10) Patent No.: US 12,545,817 B2
(45) Date of Patent: Feb. 10, 2026

(54) ARTICLE

(71) Applicant: 3M INNOVATIVE PROPERTIES COMPANY, St. Paul, MN (US)

(72) Inventors: Jeffrey A. Peterson, Hugo, MN (US); Maria A. Appeaning, St. Paul, MN (US); Christopher P. Gerlach, Woodbury, MN (US); David J. Kinning, Woodbury, MN (US); Madison P. Bennett, Minneapolis, MN (US); Marie A. Boulos, West St. Paul, MN (US); Anna M. Clausen, Minneapolis, MN (US); Victor Ho, St. Paul, MN (US); Kevin T. Huseby, Oakdale, MN (US); Stephen A. Johnson, Woodbury, MN (US); Scott M. LeBow, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 854 days.

(21) Appl. No.: 17/433,976

(22) PCT Filed: Mar. 25, 2020

(86) PCT No.: PCT/IB2020/052814
§ 371 (c)(1),
(2) Date: Aug. 25, 2021

(87) PCT Pub. No.: WO2020/201929
PCT Pub. Date: Oct. 8, 2020

(65) Prior Publication Data
US 2022/0145141 A1 May 12, 2022

Related U.S. Application Data

(60) Provisional application No. 62/825,967, filed on Mar. 29, 2019.

(51) Int. Cl.
*C09J 7/40* (2018.01)
*B32B 7/06* (2019.01)
(Continued)

(52) U.S. Cl.
CPC .................. *C09J 7/401* (2018.01); *C09J 7/22* (2018.01); *C09J 7/385* (2018.01); *C09J 7/50* (2018.01);
(Continued)

(58) Field of Classification Search
CPC ........................................................ C09J 7/50
See application file for complete search history.

(56) References Cited

U.S. PATENT DOCUMENTS

| 4,480,085 A | 10/1984 | Larson |
| 5,298,325 A | 3/1994 | Culbertson |

(Continued)

FOREIGN PATENT DOCUMENTS

| CN | 103980792 | 9/2016 |
| EP | 0882576 | 12/1998 |

(Continued)

OTHER PUBLICATIONS

Machine Translation of JP-2015208942-A, 2025 (Year: 2025).*

(Continued)

*Primary Examiner* — Liam J Heincer
(74) *Attorney, Agent, or Firm* — Sriram Srinivasan (57) ABSTRACT

Article comprising, in order: a first polymeric film having first and second, opposed major surfaces; a first primer layer having first and second opposed, major surfaces on the first major surface of the first polymeric film, wherein for a distance of at least 25 nm starting from the first major surface of the first 5 primer layer toward the second major surface of the first primer layer there is an average Si content, on a theoretical elemental basis, not greater than 15

(Continued)

atomic percent; and a first release layer having first and second opposed, major surfaces, wherein the second major surface of the first release layer is in direct contact with the first major surface of the first primer layer, wherein the first release layer comprises, on a theoretical elemental basis, Si. Articles described herein are useful, for example, as a release liner for 10 casting pressure sensitive adhesives thereon.

20 Claims, 1 Drawing Sheet

(51) Int. Cl.
| | | |
|---|---|---|
| *B32B 7/12* | (2006.01) | |
| *B32B 27/08* | (2006.01) | |
| *C09J 7/22* | (2018.01) | |
| *C09J 7/38* | (2018.01) | |
| *C09J 7/50* | (2018.01) | |

(52) U.S. Cl.
CPC . *B32B 7/06* (2013.01); *B32B 7/12* (2013.01); *B32B 27/08* (2013.01); *B32B 2255/10* (2013.01); *B32B 2255/26* (2013.01); *B32B 2405/00* (2013.01); *C09J 2483/005* (2013.01)

(56) References Cited

U.S. PATENT DOCUMENTS

| | | | |
|---|---|---|---|
| 5,380,590 A | | 1/1995 | Nakamura |
| 5,409,773 A | | 4/1995 | Kessel |
| 5,415,935 A | * | 5/1995 | Pankratz ............. C08J 7/043 428/425.5 |
| 5,424,120 A | | 6/1995 | Culbertson |
| 5,520,978 A | | 5/1996 | Boardman |
| 6,576,717 B1 | | 6/2003 | Kuo |
| 8,520,879 B2 | | 8/2013 | Yoshino |
| 8,911,873 B2 | | 12/2014 | Suwa |
| 2003/0212192 A1 | | 11/2003 | Yuan |
| 2005/0171250 A1 | | 8/2005 | Hayes |
| 2008/0274352 A1 | * | 11/2008 | Hao ............. G02B 1/11 524/80 |
| 2010/0086705 A1 | * | 4/2010 | Everaerts ............. C09J 171/02 428/522 |
| 2011/0019280 A1 | | 1/2011 | Lockridge |
| 2011/0103036 A1 | | 5/2011 | Bösl |
| 2012/0321872 A1 | | 12/2012 | Nachshon-Galili |
| 2014/0030535 A1 | | 1/2014 | Malotky |
| 2015/0044456 A1 | * | 2/2015 | Chien ............. B32B 17/10761 428/423.7 |
| 2015/0104601 A1 | * | 4/2015 | Appeaning ............. C09J 7/385 428/41.4 |
| 2015/0343750 A1 | * | 12/2015 | Liu ............. B32B 37/142 156/185 |
| 2016/0176165 A1 | * | 6/2016 | Liu ............. C08L 1/00 428/354 |
| 2016/0312056 A1 | | 10/2016 | Ouzineb |
| 2018/0094173 A1 | * | 4/2018 | Everaerts ............. C09J 133/08 |
| 2019/0010371 A1 | * | 1/2019 | Liu ............. C09J 7/385 |
| 2020/0263061 A1 | * | 8/2020 | Jetto ............. C09J 7/385 |
| 2021/0332269 A1 | * | 10/2021 | Boulos ............. C08G 77/18 |
| 2022/0010171 A1 | * | 1/2022 | Ho ............. C08L 83/10 |
| 2022/0177743 A1 | * | 6/2022 | Liu ............. C09J 7/401 |
| 2022/0355572 A1 | * | 11/2022 | Widenbrant ............. B32B 7/12 |
| 2022/0356374 A1 | * | 11/2022 | Clausen ............. C08L 33/14 |
| 2024/0059935 A1 | * | 2/2024 | Kim ............. C09J 7/401 |
| 2024/0151889 A1 | * | 5/2024 | Huseby ............. G02B 5/287 |

FOREIGN PATENT DOCUMENTS

| | | |
|---|---|---|
| JP | 2015208942 A * | 11/2015 |
| JP | 2017-113923 | 6/2017 |
| WO | WO 2009-123921 | 10/2009 |
| WO | WO 2011-084661 | 7/2011 |
| WO | WO 2013-181133 | 12/2013 |
| WO | WO 2018-034919 | 2/2018 |
| WO | WO 2020-201921 | 10/2020 |
| WO | WO 2020-201924 | 10/2020 |

OTHER PUBLICATIONS

International Search Report for PCT International Application No. PCT/IB2020/052802, mailed on Jun. 9, 2020, 4 pages.
International Search Report for PCT International Application No. PCT/IB2020/052805, mailed on Jun. 19, 2020, 4 pages.
International Search Report for PCT International Application No. PCT/IB2020/052814, mailed on Jul. 2, 2020, 4 pages.

* cited by examiner

ARTICLE

CROSS REFERENCE TO RELATED APPLICATIONS

This application is a national stage filing under 35 U.S.C. § 371 of PCT/IB2020/052814, filed Mar. 25, 2020, which claims the benefit of Provisional Application No. 62/825,967, filed Mar. 29, 2019, the disclosure of which is incorporated by reference in its/their entirety herein.

BACKGROUND

Typical silicone release liners have a-silicone release coating on a polymeric film (e.g., a polyester, polypropylene, or polyethylene film). The surface of the polymeric film is often modified via corona treatment or application of a primer coating to enhance wet out of the release coating. Energetic treatments such as corona treatment sometimes result only in a temporary surface modification that dissipates or changes over time, especially if the surface modified film experiences changing environments. Primer coatings are often more lasting, or even permanent.

Silicone release liners may be used, for example, as temporary support films within a delivery system for pressure sensitive adhesives (PSA) used to attach films to display devices (e.g., electronic displays, televisions, notebook devices, and handheld devices (e.g., smart phones and cell phones)).

SUMMARY

Applicant discovered, if the primer coating is not durable, and/or if the silicone release coating penetrates and diffuses into or through the primer coating layer, undesirable whitening of the release liner may occur when it is peeled away from a pressure sensitive adhesive (PSA). The whitening may also transfer to the PSA. The presence of whitening of the PSA can be problematic if a product is used, for example, in a display device that requires optical clarity. Further, whitening of the release liner itself, even without transfer to the PSA may be undesirable as it may denote to the user (e.g., a display device manufacturer) that the adhesive-delivery product is substandard. Further, the higher release forces that often accompany the whitening phenomenon may be detrimental to the ease of use of the adhesive delivery article.

In one aspect, the present disclosure describes an article comprising, in order:
  a first polymeric film having first and second, opposed major surfaces;
  a first primer layer having first and second opposed, major surfaces on the first major surface of the first polymeric film, wherein for a distance of at least 25 (in some embodiments at least 50) nm starting from the first major surface of the first primer layer toward the second major surface of the first primer layer there is an average Si content, on a theoretical elemental basis, not greater than 15 (in some embodiments, not less than 10, 5, 4, 3, 2, 1, or just zero) atomic percent; and
  a first release layer having first and second opposed, major surfaces, wherein the second major surface of the first release layer is in direct contact with the first major surface of the first primer layer, wherein the first release layer comprises, on a theoretical elemental basis, Si (e.g., silicone release layer).

Articles described herein are useful, for example, as a release liner for casting pressure sensitive adhesives thereon.

DETAILED DESCRIPTION

Figure 1:
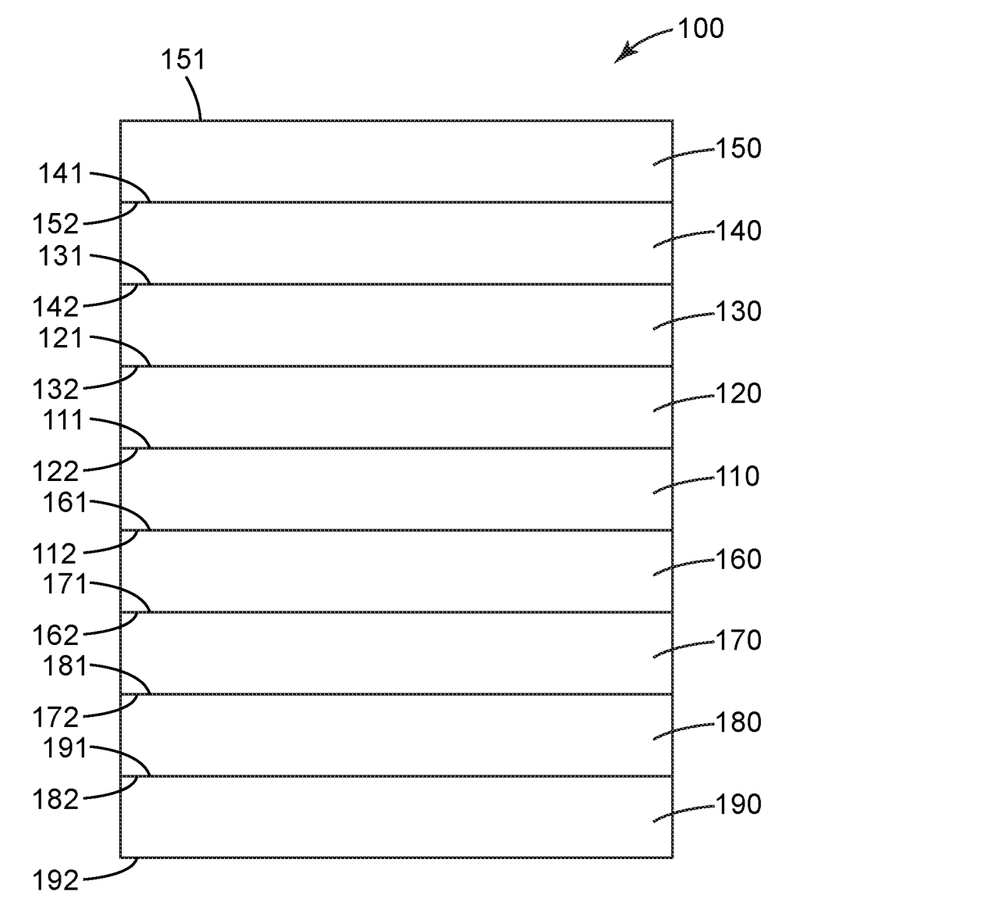
The FIG. is a schematic of an exemplary article described herein.

In some embodiments, an exemplary article described herein comprises, in order:
  a first polymeric film (e.g., one of a polyester, polypropylene, or polyethylene film) having first and second, opposed major surfaces;
  a first primer layer having first and second opposed, major surfaces on the first major surface of the first polymeric film, wherein for a distance of at least 25 (in some embodiments at least 50) nm starting from the first major surface of the first primer layer toward the second major surface of the first primer layer there is an average Si content, on a theoretical elemental basis, not greater than 15 (in some embodiments, not less than 10, 5, 4, 3, 2, 1, or just zero) atomic percent;
  a first release layer having first and second opposed, major surfaces, wherein the second major surface of the first release layer is in direct contact with the first major surface of the first primer layer, wherein the first release layer comprises, on a theoretical elemental basis, Si (e.g., silicone release layer);
  an optional first optically clear adhesive layer having first and second, opposed major surfaces on the first major surface of the first release layer; and
  an optional second polymeric film (e.g., one of a polyester, polypropylene, or polyethylene film) having first and second, opposed major surfaces on the first major surface of the first optically clear layer;
  an optional second primer layer having first and second, opposed major surfaces on the second major surface of the first polymeric film;
  an optional second release layer (e.g., a silicone release layer) having first and second, opposed major surfaces on the second major surface of the second layer;
  an optional second optically clear adhesive layer having first and second, opposed major surfaces on the second major surface of the second release layer; and
  optional third polymeric film (e.g. one of a polyester, polypropylene, or polyethylene film) having first and second, opposed major surfaces on the second major surface of the second release layer.

Referring to the FIG., exemplary article described herein 100 is shown. Article 100 comprises first polymeric film 110 having first and second, opposed major surfaces 111, 112, first primer layer 120 having first and second, opposed major surfaces 121, 122, first release layer 130 having first and second, opposed major surfaces 131, 131 optional first optically clear adhesive layer 140 having first and second, opposed major surfaces 141, 142, optional second polymeric film 150 having first and second major surfaces 151, 152, optional second layer 160 having first and second major surfaces 161, 162, optional second release layer 170 having first and second, opposed major surfaces 171, 172, optional second optically clear adhesive layer 180 having first and second, opposed major surfaces 181, 182, and optional third polymeric film 190 having first and second major surfaces 191, 192. For a distance of at least 25 nm starting from second major surface 122 of first primer layer 120 toward first major surface 121 of first primer layer 120 there is an average Si content, on a theoretical elemental basis, not greater than 15 (in some embodiments, not less than 10, 5, 4, 3, 2, 1, or just zero) atomic percent. Optionally, for a distance of at least 25 nm starting from second major surface 162 of second primer layer 160 toward first major surface 161 of first primer layer 160 there is an average Si content, on a theoretical elemental basis, not greater than 15 (in some embodiments, not less than 10, 5, 4, 3, 2, 1, or just zero) atomic percent.

In some embodiments, the first primer layer or optional second primer layer comprises a cured aqueous composition provided by curing an uncured aqueous composition (i.e., a composition where at least 50 percent by weight of liquid present is water) comprising a blend of (a) a sulfonated polyester, (b) at least one of a self-crosslinking acrylic or a self-crosslinking polyurethane binder, and (c) melamine-formaldehyde crosslinker, wherein the uncured aqueous composition has a free-formaldehyde content not greater than 0.04 (in some embodiments, not greater than 0.03, 0.025, 0.02, or even not greater than 0.01) part per million formaldehyde as determined by the Formaldehyde Test (as described in the Examples).

In some embodiments, the first primer layer or optional second primer layer comprises an uncured aqueous composition (i.e., a composition where at least 50 percent by weight of liquid present is water) comprising surfactant and a blend of (a) a first sulfonated polyester having a glass transition temperature not greater than 75 (in some embodiments, not greater than 70, 65, 60, 55, 50, 45, 40, 35, 30, 25, 20, 15, 10, 5, 0, −5; in some embodiments, in a range from −10 to 75, 0 to 60, 10 to 60, 20 to 60, 25 to 60, or even, 45 to 55) ° C., (b) a second, different sulfonated polyester that is a sulfonated polyethylene naphthalate, (c) melamine-formaldehyde crosslinker, and (d) an epoxy silane coupling agent. "Different" as used herein means having a composition of monomer moieties that differs in at least one of (a) number of distinct moieties, (b) chemical identity, or (c) relative proportion of moieties.

In some embodiments, for a single or first sulfonated polyester, the sulfonated polyester has a glass transition temperature not greater than 75 (in some embodiments, not greater than 70, 65, 60, 55, 50, 45, 40, 35, 30, 25, 20, 15, 10, 5, 0, −5; in some embodiments, in a range from −10 to 75, 0 to 60, 10 to 60, 20 to 60, 25 to 60, or even, 45 to 55) ° C. In some embodiments, if there is a first and second, compatible sulfonated polyester, the second sulfonated polyester is a sulfonated polyethylene naphthalate.

In some embodiments, for a second, different sulfonated polyester, the second sulfonated polyester has a glass transition temperature not greater than 120 (in some embodiments, not greater than 110, 100, 95, 90, 85, 80, 75, 70, 65, 60, 55, 50, 45, 40, 35, 30, 25, 20, 15, 10, 5, 0, or even −5; in some embodiments, in a range from −10 to 120, −10 to 110, −10 to 100, −10 to 90, −10 to 75, 0 to 60, 10 to 60, 20 to 60, 25 to 60, or even, 45 to 55) ° C. In some embodiments, if there is a first and second, different sulfonated polyester, the second sulfonated polyester is a sulfonated polyethylene naphthalate.

In some embodiments, the sulfonated polyester comprises an oxyalkylene (OR) having a carbon chain length of at least 2 (in some embodiments, at least 3, 4, 5, 6, 7 or even at least 8; in some embodiments, up to 20, 21, 22, 23, 24, 25, 26, 27, 28, 29, 30, 31, 32, 33, 34, 35 or even up to 36) carbon atoms.

In some embodiments, at least one of the sulfonated polyesters have the formula:

wherein n is at least 10 (in some embodiments, at least 20, 30, 40 50 100, 200, 250, 500, 1000, 5000, 8000, or even 10000), and wherein at least some R' comprise arylenesulfonate (e.g., at least one alkali arylenesulfonate). In some embodiments, the arylenesulfonate comprises at least one of a phenylenesulfonate, an isophthalylene-5-sulfonate, a terephthalylene-sulfonate, or a phthalylene-sulfonate. In some embodiments, the arylenesulfonate comprises at least one of lithium arylenesulfonate, sodium arylenesulfonate, potassium arylenesulfonate, calcium arylenesulfonate, beryllium arylenesulfonate, a zinc arylenesulfonate, a zirconium arylenesulfonate, a vanadium arylenesulfonate, copper arylenesulfonate, or aluminum arylenesulfonate.

Exemplary sulfonated polyesters are available, for example, under the trade designations "SKYBON" from SKCs America Inc., Irvine, CA, and "EASTEK" from Eastman Chemical Company, Kingsport, TN Exemplary sulfonated polyethylene naphthalate can be synthesized by techniques known in the art such as from dimethyl naphthalate, a dimethyl sodium 5-sulfoisophthalate, and ethylene glycol as described in Examples 3 and 4.

In some embodiments, the sulfonated polyester is present in a range from 0.1 to 40 (in some embodiments, in a range from 10 to 70 (in some embodiments, in a range from 10 to 50, or even 25 to 50) weight percent, based the total solids content of the uncured aqueous composition. For an uncured aqueous composition comprising—a first and second sulfonated polyester, in some embodiments, the first sulfonated polyester is present in a range from greater than zero to 50 (in some embodiments, in a range from 0.1 to 50, 5 to 45, 10 to 40, 10 to 35, or even 10 to 20) weight percent, based on the total solids of the uncured aqueous composition. In some embodiments, a sulfonated polyethylene naphthalate is present in a range from greater than 0 to 40 (in some embodiments, in a range from 10 to 40, or even 20 to 30) weight percent, based on the total solids of the uncured aqueous composition.

Self-crosslinking acrylics refer to acrylic latexes having functional groups that can react and crosslink with each other (i.e., capable of crosslinking without the addition of an additional chemical crosslinking agent). Exemplary self-crosslinking acrylics are available, for example, under the trade designation "AC 2314" or "AC 2360" from Alberdingk Boley Inc, Greensboro, NC.

In some embodiments, the self-crosslinking acrylic is present in a range from 10 to 80 (in some embodiments, in a range from 10 to 70, 25 to 70, 30 to 70, 35 to 70, or even 40 to 70) weight percent, based the total solid content of the uncured aqueous composition.

Self-crosslinking polyurethanes refer to polyurethane latexes comprising functional groups that can react and crosslink with each other (i.e., capable of crosslinking without the addition of an additional chemical crosslinking agent). Exemplary self-crosslinking polyurethanes are available, for example, under the trade designation "TURBOSET ULTRA PRO" and "TURBOSET 2027" from Lubrizol, Wickliffe, OH.

In some embodiments, the self-crosslinking polyurethane binder is present in a range from 10 to 80 (in some embodiments, in a range from 10 to 70, 25 to 70, 30 to 70, 35 to 70, or even 40 to 70) weight percent, based the total solid content of the uncured aqueous composition.

Melamine-formaldehyde crosslinker refers to water dispersible partially alkylated melamine-formaldehyde resins. In some embodiments, the melamine-formaldehyde crosslinker comprises a partially alkoxymethylated melamine formaldehyde resin. An exemplary water dispersible partially alkylated melamine-formaldehyde resin is available, for example, under the trade designation "CYMEL 327" from Allnex Corporation, Alpharetta, GA.

In some embodiments, the melamine-formaldehyde crosslinker is present in a range from 1 to 25 (in some embodiments, in a range from 1 to 20, 1 to 15, 2 to 15, or even 2 to 11) weight percent, based the total solids content of the uncured aqueous composition.

Exemplary surfactants include nonionic surfactants such as nonionic ethoxylated alcohols. In some embodiments, the surfactant is present in a range from 0 to 2 (in some embodiments, in a range from 0.05 to 1, 0.05 to 0.5, 0.05 to 0.25, or even 0.05 to 0.15) weight percent, based the total solids content of the aqueous composition. Exemplary surfactants are available, for example, under the trade designations "TOMADOL 25-9" from Air Products, Allentown, PA; and "DYNOL 607" from Evonik Nutrition & Care GmbK, Essen, Germany.

Exemplary epoxy silane coupling agents include glycidol epoxy functional silane. Exemplary epoxy silane coupling agents are available, for example, under the trade designations "SILQUEST A-187" and "WETLINK 78" from Momentive Performance Chemicals Inc., Waterford, NY.

In some embodiments, the silane is present in a range from 1 to 30 (in some embodiments, in a range from 2 to 25, or even 5 to 20) weight percent, based on total solids content of the uncured aqueous composition.

In some embodiments, uncured aqueous composition described herein further comprise colloidal silica. In some embodiments, the colloidal silica is present in a range from greater than 0 to 10 (in some embodiments, in a range from 1 to 5, 1 to 3, or even 1 to 2.5) weight percent, based the total solids content of the uncured aqueous composition. Exemplary colloidal silicas are available, for example, under the trade designation "AERODISP W-1226" from Evonik Corporation, Allentown, PA; and "LUDOX" from & Co. Americas, Columbia, MD.

In some embodiments, the colloidal silica comprises silica particles in a range from 0.05 to 10 (in some embodiments, in a range from 0.1 to 10, 0.1 to 5, 0.5 to 5, or even 1 to 2.5) micrometers.

In some embodiments, uncured aqueous composition described herein further comprise a catalyst. Although not wanting to be bound by theory, it is believed that the catalyst increases the reaction rate and completeness of the crosslinked polymer. An exemplary catalyst is an amine blocked para-toluene sulfonic acid catalyst, available, for example, under the trade designation "CYCAT 4045" from Allnex, Alpharetta, GA.

In some embodiments, the catalyst is present in a range from 0 to 2 (in some embodiments, in a range from 0.01 to 1.5, 0.1 to 1, or even 0.1 to 0.5) weight percent, based the total solid of the uncured aqueous composition.

The raw materials for making the uncured aqueous composition by conventional techniques known in the art such as die coating, gravure coating, Mayer rod, air knife coating, spin coating, and dip coating.

Uncured aqueous composition described herein can be cured by conventional techniques known in the art such as thermal curing.

For further discussion of compositions for the first or optional primer layer see applications having U.S. Ser. No. 62/825,961 and U.S. Ser. No. 62/825,964, filed the same date as the instant application, the disclosures of which are incorporated herein by reference.

In some embodiments, the optional primer layer comprises a corona treatment, for example, of a polyethylene terephthalate (PET) film.

In some embodiments, the first or optional second optically clear adhesive layer comprises a (meth)acrylate copolymer having pendant (meth)acryloyl groups and optionally pendant hydroxyl groups (e.g., compounded with a free-radical generating initiator), wherein the (meth)acrylate copolymer has a weight average molecular weight of 50,000 to 600,000 Daltons and an average molecular weight between (meth)acryloyl groups equal to at least 16,000 Daltons. In some embodiments, the first or optional second optically clear adhesive layer has a thickness in a range from 100 to 250 (in some embodiments, in a range from 125 to 200) micrometers.

In some embodiments of articles described herein if the first optically clear adhesive layer is peeled from the first major surface of the first release layer, the first major surface of the first release layer exhibits a haze not greater than 10% (measured using a haze meter obtained under the trade designation "HAZE-GARD PLUS" from BYK-Gardner, Columbia, MD). In some embodiments of articles described herein if the optional second optically clear adhesive layer is peeled from the second major surface of the optional second release layer, the second major surface of the optional second release layer exhibits a haze not greater than 10% (measured using a haze meter obtained under the trade designation "HAZE-GARD PLUS" from BYK-Gardner, Columbia, MD).

In some embodiments of articles described herein, if the first or optional second optically clear adhesive layer is peeled from the first major surface of the respective release layer, the first major surface of the release layer has a surface roughness, $R_a$, not greater than 0.15 (in some embodiments, not greater than 0.1, or even not greater than 0.05) micrometer (as described in the Examples). In some embodiments of articles described herein, if the optional second optically clear adhesive layer is peeled from the second major surface of the optional second release layer, the second major surface of the release layer has a surface roughness, $R_a$, not greater than 0.15 (in some embodiments, not greater than 0.1, or even not greater than 0.05) micrometer (as described in the Examples).

In some embodiments of articles described herein, the first or optional primer second layer independently has a thickness in a range from 0.05 to 0.5 (in some embodiments, in a range from 0.01 to 0.5) micrometer.

In some embodiments, the first, optional second, or optional third polymeric film is independently one of a polyester, polypropylene, or polyethylene film.

In some embodiments of articles described herein, the first, optional second, or optional third polymeric film has a thickness in a range from 25 to 125 (in some embodiments, in a range from 50 to 75) micrometers.

In some embodiments of articles described herein, the first or optional second release layer has a thickness of at least 0.02 (in some embodiments, in a range from 0.025 to 0.5, or even 0.05 to 0.5) micrometer.

In some embodiments, articles described herein have a thickness in a range from 200 to 400 micrometers.

Articles described herein are useful, for example, as a release liner for casting pressure sensitive adhesives thereon.

EXEMPLARY EMBODIMENTS

1. An article comprising, in order:
   a first polymeric film having first and second, opposed major surfaces;
   a first primer layer having first and second opposed, major surfaces on the first major surface of the first polymeric film, wherein for a distance of at least 25 (in some embodiments at least 50) nm starting from the first major surface of the first primer layer toward the second major surface of the first primer layer there is an average Si content, on a theoretical elemental basis, not greater than 15 (in some embodiments, not less than 10, 5, 4, 3, 2, 1, or just zero) atomic percent; and
   a first release layer having first and second opposed, major surfaces, wherein the second major surface of the first release layer is in direct contact with the first major surface of the first primer layer, wherein the first release layer comprises, on a theoretical elemental basis, Si (e.g., silicone release layer).

2. The article of Exemplary Embodiment 1, further comprising a first optically clear adhesive layer having first and second, opposed major surfaces on the first major surface of the first release layer.

3. The article of Exemplary Embodiment 2, wherein the first optically clear adhesive layer comprises a (meth)acrylate copolymer having pendant (meth)acryloyl groups and optionally pendant hydroxyl groups (e.g., compounded with a free-radical generating initiator), wherein the (meth)acrylate copolymer has a weight average molecular weight of 50,000 to 600,000 Daltons and an average molecular weight between (meth)acryloyl groups equal to at least 16,000 Daltons.

4. The article of any either Exemplary Embodiment 2 or 3, wherein the first optically clear adhesive layer has a thickness in a range from 100 to 250 (in some embodiments, in a range from 125 to 200) micrometers.

5. The article of any of Exemplary Embodiments 2 to 4, wherein if the first optically clear adhesive layer is peeled from the first major surface of the first release layer the first major surface of the first release layer exhibit a haze not greater than 10% (measured using a haze meter obtained under the trade designation "HAZE-GARD PLUS" from BYK-Gardner, Columbia, MD).

6. The article of any of Exemplary Embodiments 2 to 5, wherein if the first optically clear adhesive layer is peeled from the first major surface of the first release layer, the first major surface of the first release layer has a surface roughness, $R_a$, not greater than 0.15 (in some embodiments, not greater than 0.1, or even not greater than 0.05 micrometer (as described in the Examples).

7. The article of any of Exemplary Embodiments 2 to 6, further comprising a second polymeric film having first and second, opposed major surfaces on the first release layer, wherein the article comprises in order, the first polymeric film, the first primer layer, the first release layer, the first optically clear layer, and the second polymeric film.

8. The article of Exemplary Embodiment 7, wherein the second polymeric film is one of a polyester, polypropylene, or polyethylene film.

9. The article of any preceding Exemplary Embodiment, wherein the second polymeric film has a thickness in a range from 25 to 125 (in some embodiments, in a range from 50 to 75) micrometers.

10. The article of any preceding Exemplary Embodiment, wherein the first polymeric film has a thickness in a range from 25 to 125 (in some embodiments, in a range from 50 to 75) micrometers.

11. The article of any preceding Exemplary Embodiment, wherein the first primer layer has a thickness in a range from 0.05 to 0.5 (in some embodiments, in a range from 0.01 to 0.5) micrometer.

12. The article of any preceding Exemplary Embodiment, wherein the first release layer has a thickness of at least 0.02 (in some embodiments, in a range from 0.025 to 0.5, or even 0.05 to 0.5) micrometer.

13. The article of any preceding Exemplary Embodiment, wherein the first polymeric film is one of a polyester, polypropylene, or polyethylene film.

14. The article of any preceding Exemplary Embodiment having a thickness in a range from 200 to 400 micrometers.

15. The article of any preceding Exemplary Embodiment, further comprising a second primer layer on the second major surface of the first polymeric film, the second primer layer having first and second, opposed major surfaces.

16. The article of Exemplary Embodiment 15, wherein for a distance of at least 25 (in some embodiments at least 50) nm starting from the second major surface of second primer layer toward the first major surface of the second primer layer there is an average Si content, on a theoretical elemental basis, not greater than 15 (in some embodiments, not less than 10, 5, 4, 3, 2, 1, or just zero) atomic percent.

17. The article of either Exemplary Embodiment 15 or 16, further comprising a second release layer having first and second, opposed major surfaces, wherein the first major surface of the second release layer is in direct contact with the second major surface of the second primer layer.

18. The article of Exemplary Embodiment 17, wherein the second release layer comprises, on a theoretical elemental basis, Si.

19. The article of either Exemplary Embodiment 17 or 18, further comprising a second optically clear adhesive layer on the second major surface of the second release layer.

20. The article of Exemplary Embodiment 19, wherein the second optically clear adhesive layer comprises a (meth)acrylate copolymer having pendant (meth)acryloyl groups and optionally pendant hydroxyl groups (e.g., compounded with a free-radical generating initiator), wherein the (meth) acrylate copolymer has a weight average molecular weight of 50,000 to 600,000 Daltons and an average molecular weight between (meth)acryloyl groups equal to at least 16,000 Daltons.

21. The article of any either Exemplary Embodiment 19 or 20, wherein the second optically clear adhesive layer has a thickness in a range from 100 to 250 (in some embodiments, in a range from 125 to 200) micrometers.

22. The article of any of Exemplary Embodiments 20 to 23, wherein if the second optically clear adhesive layer is peeled from the second release layer the second major surface of the second release layer exhibits a haze not greater than 10% (measured using a haze meter obtained under the trade designation "HAZE-GARD PLUS" from BYK-Gardner, Columbia, MD).

23. The article of any of Exemplary Embodiments 19 to 22, wherein if the second optically clear adhesive layer is peeled from the second release layer the second major surface of the second release layer has a surface roughness, $R_a$, not greater than 0.15 (in some embodiments, not greater than 0.1, or even not greater than 0.05 micrometer (as described in the Examples).

24. The article of any of Exemplary Embodiments 19 to 23, further comprising a third polymeric film having first and second major surfaces on the second release layer, wherein the article comprises in order, the first polymeric film, the first primer layer, the first release layer, the first optically clear layer, the second polymeric film, the second primer layer, the second optically clear adhesive, and the third polymeric film.

25. The article of Exemplary Embodiment 24, wherein the third polymeric film is one of a polyester, polypropylene, or polyethylene film.

26. The article of any of Exemplary Embodiments 19 to 25, wherein the third film has a thickness in a range from 25 to 125 (in some embodiments, in a range from 50 to 75) micrometers.

27. The article of any of Exemplary Embodiments 19 to 26, wherein the second primer layer has a thickness in a range from 0.05 to 0.5 (in some embodiments, in a range from 0.01 to 0.5) micrometer.

28. The article of any of Exemplary Embodiments 19 to 27 wherein the second release layer has a thickness of at least 0.02 (in some embodiments, in a range from 0.025 to 0.5, or even 0.05 to 0.5) micrometer.

29. The article of any of Exemplary Embodiments 19 to 28 having a thickness in a range from 200 to 400 micrometers.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Materials used in the preparation of the resins, solutions, and formulations of the examples are listed in Table 1, below.

TABLE 1

| Material Name, Acronym, or Designation | Description | Source |
| --- | --- | --- |
| Isopropanol | Isopropyl alcohol (2-propanol) | VWR International LLC., Radner, PA |
| TA | Terephthalic acid | CEPSA Quimia, Montreal, Quebec, Canada |
| SSIPA | 5-sulfoisophthalic acid, sodium salt (Sodium sulfoisophthalic acid) | FutureFuel, Batesville, AR |
| IPA | Isophthalic acid | Eastman Chemical, Kingsport, TN |
| NPG | Neopentyl glycol | Eastman Chemical, Kingsport, TN |
| EG | Ethylene glycol | ME Global, Midland, MI |
| AT | Antimony triacetate | Arkema, Philadelphia, PA |
| SA | Sodium acetate | Alfa Aesar, Ward Hill, MA |
| MA | Maleic anhydride | Sigma-Aldrich, St. Louis, MO |
| TT | Tetrabutyl titanate | Sigma-Aldrich, St. Louis, MO |
| TOMADOL 25-9 | Non-ionic surfactant, obtained under the trade designation "TOMADOL 25-9" | Evonik Corporation, Parsippany, NJ |
| SILQUEST A-187 | Glycidoxypropyltrimethoxy (epoxy functional) silane, obtained under the trade designation "SILQUEST A-187" | Momentive Performance Chemicals Inc., Waterford, NY |
| AERODISP W 1226 | Aqueous dispersion of hydrophilic fumed silica, obtained under the trade designation "AERODISP W 1226" | Evonik Corporation, Parsippany, NJ |
| CYMEL 327 | Melamine formaldehyde resin, obtained under the trade designation "CYMEL 327" | Allnex USA Inc., Alpharetta, GA |
| CYCAT 4045 | Para toluene sulfonic acid catalyst, amine blocked, obtained under the trade designation "CYCAT 4045" | Allnex USA Inc., Alpharetta, GA |
| VTSP | A divinyl terminated silicone polymer with viscosity of 250 to 400 cS, a vinyl content of 0.53 to 0.66 wt. %, and containing 150 ppm platinum, and 0.7 wt. % inhibitor | Dow Corning Corporation, Midland, MI |
| HFSX | A liquid, hydride functional polysiloxane crosslinker component, 100% solids and having a viscosity at 25° C. of 30 cS, obtained under the trade designation "SYL-OFF 7678 CROSSLINKER" | Dow Corning Corporation, Midland, MI |
| NDC | Dimethyl-2,6-napthalene dicarboxylate | Sigma-Aldrich, St. Louis, MO |
| Trimesic Acid | Benzene-1,3,5-tricarboxylic acid | Sigma-Aldrich, St. Louis, MO |
| DMSSIP | Dimethyl 5-sulfoisophthalate, sodium salt (Dimethyl sodium 5-sulfoisophthalate) | Sigma-Aldrich, St. Louis, MO |
| Calcium Acetate | Calcium acetate | Sigma-Aldrich, St. Louis, MO |
| Cobalt Acetate | Cobalt acetate | Sigma-Aldrich, St. Louis, MO |
| Adipic Acid | Hexanedioic acid | Sigma-Aldrich, St. Louis, MO |
| Sebacic Acid | Decanedioic acid | Sigma-Aldrich, St. Louis, MO |
| EASTEK 1100 | Sulfonated polyester aqueous dispersion containing 33 wt. % polymer solids, obtained under the trade designation "EASTEK 1100" | Eastman Chemical Co., Kingsport, TN |
| DYNOL 607 | An ethoxyated acetylenic gemini surfactant, obtained under the trade designation "DYNOL 607" | Evonik, Essen, Germany |
| TURBOSET 2027 | Self-crosslinking waterborne polyurethane composite dispersion, obtained under the trade designation "TURBOSET 2017" | Lubrizol, Wickliffe, OH |

TABLE 1-continued

| Material Name, Acronym, or Designation | Description | Source |
|---|---|---|
| AC 2314 | Self-crosslinking polyacrylate (acrylic) dispersion, obtained under the trade designation "ALBERDINGKUSA AC 2314" | Alberdingk Boley Inc. Greensboro, NC |

Example 1

Preparation of SulfoPET 1 Resin

To a clean, dry, oil jacketed 100-gallon (378.5-liter) stainless-steel reactor, the following materials were added: 125.1 lbs. (56.7 kg) of terephthalic acid (TA); 23.4 lbs. (10.6 kg) of 5-sodium sulfoisophthalic acid (SSIPA); 123.7 lbs. (56.1 kg) of isophthalic acid (IPA); 123.7 lbs. (56.1 kg) of neopentyl glycol (NPG); 146.8 lbs. (66.6 Kg) of ethylene glycol (EG); 126.6 grams of antimony triacetate (AT), and 318.5 grams of sodium acetate (SA). The stainless-steel reactor was placed under 30 psig (308.1 kPa) of nitrogen pressure. The contents of the stainless-steel reactor were heated, and it is believed transesterification typical for polyester synthesis took place. The batch was heated to about 485° F. (about 252° C.). Once esterification was determined to be completed, pressure in the reactor was slowly vented.

It is believed a typical polyester polymerization was then commenced. Vacuum was slowly pulled on the reactor and heat was applied. Excess glycol was removed. Eventually, the stainless-steel reactor reached a temperature of 525° F. (274° C.) and a vacuum of as low as 1.5 mm Hg (0.2 kPa). Once target IV (intrinsic viscosity) of about 0.50 dL/g was achieved, the batch was pressurized (under nitrogen) and drained into aluminum trays. The cooled and solidified contents of the trays was ground up and utilized for Sulfo-PET 1 solution making. The resultant polymer was composed of moieties from about 5.5 mol % SSIPA, 47.5 mol % TA, and 47 mol % IPA on an acids basis; and 75 mol % NPG and 25 mol % EG on a diol basis.

Preparation of SulfoPET 1 Resin Solution 726.4 grams of the SulfoPET 1 resin, 726.4 grams of isopropanol and 2905.6 grams of water were added to a room temperature (about 22° C.), 2-gallon (7.57-liter) stainless-steel reactor. The stainless-steel reactor was heated to 88° C. and held at this temperature for 90 minutes. The batch was then heated to 94° C. and held at temperature until the isopropanol was driven off through a separation column. The stainless-steel reactor was then drained, and the resultant material, SulfoPET 1 resin solution was a 20 wt. % solids aqueous dispersion containing the SulfoPET 1.

Preparation of SulfoPET 1/Sulfopolyester ("EASTEK 1100") Primer Formulation

Into a 113-mL glass jar, the following components were added, and then stirred for 5 minutes: 3.8 grams of SulfoPET 1 Resin Solution, 2.1 grams of sulfopolyester ("EASTEK 1100"), 1 gram of non-ionic surfactant ("TOMADOL 25-9") (added as a 10 wt. % dilution in deionized (DI) water), 41.0 grams of DI water, and 0.5 gram of glycidoxypropyltrimethoxy (epoxy functional) silane ("SILQUEST A-187"). Then the following components were added: 0.3 gram of aqueous dispersion of hydrophilic fumed silica ("AERODISP W 1226"), 0.3 gram of melamine formaldehyde resin ("CYMEL 327"), and 0.1 gram of para toluene sulfonic acid catalyst, amine blocked ("CYCAT 4045") (added as a 10 wt. % dilution in DI water). This mixture was stirred for 3 minutes and the coating solution was then ready for coating.

Example 2

Preparation of SulfoPET 2 Resin

To a stainless-steel 1-gallon (3.78-liter) reactor at room temperature (about 22° C.), equipped with electrical heating, an overhead separation column, and a vacuum pump, the following components were added: 842.6 grams of ethylene glycol (EG), 269.3 grams of neopentyl glycol (NPG), 663.7 grams of terephthalic acid (TA), 663.7 grams of isophthalic acid (IPA), 8.5 grams of maleic anhydride (MA), 138.2 grams of SSIPA, 0.405 gram of sodium acetate (SA), and 0.203 gram of tetrabutyl titanate (TT).

Once added, it is believed these materials underwent a typical polyester polymerization process as described above for SulfoPET Resin 1. The stainless-steel reactor was drained, and the reaction product resin was cooled to room temperature (about 22° C.). Then the resin was ground up into small pieces for dissolution. The resultant polymer had an approximate composition of 6.0 mol % SSIPA, 1.0 mol % MA, 46.5% IPA, and 46.5 mol % TA on an acid moieties basis; and 30 mol % NPG and 70 mol % EG on a diols basis.

Preparation of SulfoPET 2 Resin Solution 726.4 grams of SulfoPET 2, 726.4 grams of isopropanol, and 2905.6 grams of water were added at room temperature (about 22° C.) to a 2-gallon (7.57-liter) stainless-steel reactor. The reactor was heated to 88° C. and held at this temperature for 90 minutes. The batch was then heated to 94° C. and held at temperature until the isopropanol was driven off through a separation column. The reactor was then drained, and the resultant material was a 20 wt. % solids aqueous dispersion containing the SulfoPET 2.

Preparation of SulfoPET 2 Primer Formulation

Into a 113-mL glass jar, the following components were added, and then stirred for 5 minutes: 7 grams of SulfoPET 2 Resin Solution, 1 gram non-ionic surfactant ("TOMADOL 25-9") (added as a 10 wt. % dilution in DI water), 41.0 grams DI water, 0.5 gram glycidoxypropyltrimethoxy (epoxy functional) silane ("SILQUEST A-187"). Then the following components were added: 0.3 gram of aqueous dispersion of hydrophilic fumed silica ("AERODISP W 1226"), 0.3 gram melamine formaldehyde resin ("CYMEL 327"), and 0.1 gram para toluene sulfonic acid catalyst, amine blocked ("CYCAT 4045") (added as a 10 wt. % dilution in DI water). This mixture was stirred for 3 minutes and the coating solution was then ready for coating.

Example 3

Preparation of SulfoPEN 1 Resin

To a stainless-steel 2-gallon (7.57-liter) reactor, the following components were added: 1635.4 grams of EG, 437.5 grams of NPG, 3326 grams of dimethyl-2,6-naphthalene dicarboxylate (NDC), 143.1 grams of trimesic acid, 288.2 grams of dimethyl sodiumsulfoisophthalate (DMSSIP), 0.19 gram of calcium acetate, 0.19 gram of cobalt acetate, 1.88 gram of sodium acetate (SA), and 0.19 gram of tetrabutyl titanate (TT).

Once added, these materials underwent a typical polyester polymerization process as described above for SulfoPET 1 resin preparation. The reactor was drained, and the reaction product resin was cooled to room temperature (about 22° C.). Then the resin was ground up into small pieces for dissolution. The resultant polymer had an approximate composition of 6.4 mol % DMSSIP, 4.5 mol % trimesic acid and 89.2 mol % NDC on an acid/ester moieties basis; and 27.5 mol % NPG and 72.5 mol % EG on a diols basis.

Preparation of SulfoPEN 1 Resin Solution 726.4 grams of SulfoPEN 1, 726.4 g of isopropanol and 2905.6 grams of water were added to a room temperature (about 22° C.), 2-gallon (7.57-liter) stainless steel reactor. The reactor was heated to 88° C. and held at this temperature for 90 minutes. The batch was then heated to 94° C. and held at temperature until the isopropanol was driven off through a separation column. The reactor was then drained, and the resultant material was a 20 wt. % solids aqueous dispersion containing the SulfoPEN 1.

Preparation of SulfoPEN 1 Primer Formulation

Into a 113-milliliter glass jar, the following components were added and stirred for 5 minutes: 7 grams SulfoPEN 1 Resin Solution, 1 gram non-ionic surfactant ("TOMADOL 25-9") (added as a 10 wt. % dilution in DI water), 41.0 grams DI water, and 0.5 gram glycidoxypropyltrimethoxy (epoxy functional) silane ("SILQUEST A-187"). Then the following components were added: 0.3 gram of aqueous dispersion of hydrophilic fumed silica ("Aerodisp W 1226"), 0.3 gram melamine formaldehyde resin ("CYMEL 327"), and 0.1 gram para toluene sulfonic acid catalyst, amine blocked ("CYCAT 4045") (added as a 10 wt. % dilution in DI water). This mixture was stirred for 3 minutes and the coating solution was then ready for coating.

Example 4

Preparation of SulfoPET 3 Resin

To a stainless-steel 2-gallon (7.57-liter) reactor at room temperature (about 22° C.), equipped with electrical heating, an overhead separation column, and a vacuum pump, the following components were added: 2152 grams of EG, 575.7 grams of NPG, 1222 grams of TA, 128.8 grams of trimesic acid, 1509.6 grams of adipic acid, 329.6 grams of sebacic acid, 350.5 g of SSIPA, 0.09 gram of calcium acetate, 0.09 gram of cobalt acetate, 0.85 gram of SA, and 0.09 gram of TT. Once added, these materials underwent a typical polyester polymerization process as described in SulfoPET 1 resin preparation above. The reactor was drained, and the reaction product resin was cooled to room temperature (about 22° C.). Then the resin was ground up into small pieces for further dissolution. The resultant polymer had an approximate composition of 6.5 mol % SSIPA, 8.1 mol % sebacic acid, 45.7% adipic acid, 3.1 wt. % trimesic acid and 36.6% TA on an acid moieties basis; and 27.5 mol % NPG and 72.5 mol % EG on a diols basis.

Preparation of SulfoPET 3 Resin Solution 726.4 grams of the SulfoPET 3, 726.4 grams of isopropanol, and 2905.6 grams of water were added at room temperature (about 22° C.) to a 2-gallon (7.57-liter) stainless-steel reactor. The reactor was heated to 88° C. and held at this temperature for 90 minutes. The batch was then heated to 94° C. and held at temperature until the isopropanol was driven off through a separation column. The reactor was then drained, and the resultant material is a 20 wt. % solids aqueous dispersion containing the SulfoPET 3.

Preparation of SulfoPET 3 Primer Formulation

Into a 113-mL jar, the following components were added and then stirred 1 minute: 7 grams of SulfoPET 3 Resin Solution, 1 gram of non-ionic surfactant ("TOMADOL 25-9") (as a 10 wt. % dilution in DI water), 41 grams DI water, and 0.5 gram glycidoxypropyltrimethoxy (epoxy functional) silane ("SILQUEST A-187"). Then the following components were added: 0.3 gram of aqueous dispersion of hydrophilic fumed silica ("AERODISP W 1226"), 0.3 gram of melamine formaldehyde resin ("CYMEL 327"), and 0.1 gram of para toluene sulfonic acid catalyst, amine blocked ("CYCAT 4045") (as a 10 wt. % dilution in DI water). This mixture was stirred for 3 minutes and the coating solution was then ready for coating.

Example 5

Preparation of SulfoPET 2 Primer Formulation with Sulfonated Polyester Aqueous Dispersion Containing 33 wt. % Polymer Solids ("EASTEK 1100")

Into a 113 mL glass jar, the following components were added and then stirred for 5 minutes: 3.5 grams of SulfoPET 2 Resin Solution, 2.1 grams of sulfonated polyester aqueous dispersion containing 33 wt. % polymer solids ("EASTEK 1100"), 1 gram non-ionic surfactant ("TOMADOL 25-9") (as a 10 wt. % dilution in DI water), 41 grams of DI water, and 0.5 gram of glycidoxypropyltrimethoxy (epoxy functional) silane ("SILQUEST A-187"). Then the following components were added: 0.3 gram of aqueous dispersion of hydrophilic fumed silica "AERODISP W 1226"), 0.3 gram of melamine formaldehyde resin ("CYMEL 327"), and 0.1 gram of para toluene sulfonic acid catalyst, amine blocked ("CYCAT 4045") (added as a 10 wt. % dilution in DI water). The mixture was stirred for 3 minutes and the coating solution was then ready for coating.

Example 6

Preparation of SulfoPEN 1 Primer Formulation with Sulfonated Polyester Aqueous Dispersion Containing 33 wt. % Polymer Solids ("EASTEK 1100")

Into a 113 mL glass jar, the following components were added and then stirred for 5 minutes: 3.5 grams of SulfoPEN 1 Resin Solution, 2.1 grams of glycidoxypropyltrimethoxy (epoxy functional) silane ("EASTEK 1100"), 1 gram of non-ionic surfactant ("TOMADOL 25-9") (as a 10 wt. % dilution in DI water), 41 grams of DI water and 0.5 gram of Glycidoxypropyltrimethoxy (epoxy functional) silane ("SILQUEST A-187"). Then the following components were added: 0.3 gram of aqueous dispersion of hydrophilic fumed silica ("AERODISP W 1226"), 0.3 gram of melamine formaldehyde resin ("CYMEL 327"), and 0.1 gram para toluene sulfonic acid catalyst, amine blocked ("CYCAT 4045") (added as a 10% dilution in DI water). The mixture was stirred for an additional 3 minutes and the coating solution was then ready for coating.

Preparation of Oriented Films Coated with the Primer Formulations of Examples 1-6

Primer Formulations were coated onto non-oriented, cast PET film of thickness ranging from 250-650 mm, using a coating rod (obtained under the trade designation "MAYER ROD, NO. 6" from RDS Specialties, Webster, NY). The samples were dried in a lab batch electric oven (obtained under the trade designation "PROTOCOL PLUS" from Despatch Industries, Minneapolis, MN) for 3 minutes at 80°

C. Samples were then loaded into a lab scale batch film stretching machine (obtained under the trade designation "KARO IV" from Bruckner Maschinenbau GmbH & Co. KG, Siegsdorf, Germany). The samples were pre-heated at 98° C. for 45 seconds, then simultaneously stretched to 4 times the unstretched dimension in the transverse direction and 1.5 times the unstretched dimension in the machine direction, followed by heating for 15 seconds at 215° C. to 225° C. The resultant films were converted to 12.7 cm by 25.4 cm sheets for subsequent testing.

Preparation of Release Liners of Examples 1-6

Primer coated stretch-oriented polyester films were coated with a silicone release formulation which is a mixture of a VTSP, and HFSX. VTSP (100 parts by wt.) and HFSX (2.54 parts by wt.) were mixed, yielding a hydride:vinyl ratio of 1.2:1, and the mixture was stirred to give a homogeneous solution. The 12.7 cm by 25.4 cm sheet samples were taped one after another onto a roll of 2 mil (51 micrometers) PET carrier film (which was an uncoated, biaxially oriented PET homopolymer film) so that continuous coating equipment could be employed. The silicone release formulation was coated onto the primed side of the test films made as above, using a gravure coater with a 200 QCH pattern gravure roll at a line speed of 90 ft./min. (27.4 m/min), and was then dried and cured in an in-line oven set at 121° C. with a residence time of 20 seconds.

Silicone Anchorage Test

For Examples 1-6, roll samples of each silicone coated liner were stored under Constant Temperature and Humidity Room (CTH) condition (23° C., 50% RH) for 3 days. A separate set of letter-sized samples, each bearing one of the 12.7 cm by 25.4 cm test samples, were cut from each roll and hung vertically in a sealed chamber (23° C., 98% RH) for 7 days. To test the anchorage, a piece of silicone rubber was rubbed 5 times back and forth over the silicone coated side of the samples described above. The anchorage test is recorded as a "pass" if no visible amount of silicone was rubbed away from the surface. Films of Examples 1-6 each passed this test in both variations.

Preparation of PSA Coated Films of Examples 1-6

Onto the silicone coated films, coatings of adhesive were prepared as described in Example 1, col. 14 lines 35-60, of U.S. Pat. No. 8,911,873 B2 (Suwa et al.), the disclosure of which is incorporated herein by reference, except that the primed and silicone coated films of these Examples were used as substrate films instead of the substrate films ("CERAPEEL"), the adhesive was notch bar coated to 130-170 micrometers thick, and the over-laminated release film was a release liner (obtained under the trade designation "RF 22N" from SKC Haas, Seoul, Korea) rather than the films obtained under the trade designation "PUR EX A-31."

Extractables Test

For Examples 1-6, extractables (expressed as % Extractables) is measured with an X-ray fluorescence detector (obtained under the trade designation "OXFORD 8000 XRF" from Oxford Instruments, Bristol, United Kingdom). % Extractables is a measurement of the silicone coating weight difference of a silicone coated film sample disk before and after extraction with methyl isobutyl ketone (MIBK). The silicone coating weight of a sample disk was inferred via the XRF instrument before extraction in solvent, then the same sample was put into a 100 mL glass jar with 25 grams of MIBK, sealed, and put on a roller mill that was gently agitated for 30 minutes. The sample disk was removed and allowed to evaporate dry in air for 10 minutes, coating side up. The extracted sample was remeasured in the XRF instrument as before. % Extractables were calculated as the change in the silicone levels after extraction. Most desirable values are not greater than 5% Extractables.

Rub Off Test

For Examples 1-6, the Rub Off Test is the measure of the amount of silicone coating removed from a silicone coated sample after it was rubbed with a steel wool pad on an abrasion test instrument (obtained under the trade designation "TABER 5800 HEAVY DUTY LINEAR ABRADER" from Taber Industries, North Tonawanda, NY).

The coating weight of the silicone on the unabraded sample (Sample A) was measured using the X-ray fluorescence detector ("OXFORD 8000 XRF") as described above for the Extractables Test. This was recorded as the unrubbed (Sample A) % silicone. Another sample strip was cut adjacent to the first sample and mounted onto the abrasion test instrument ("TABER 5800 HEAVY DUTY LINEAR ABRADER") test bed using adhesive tape (obtained under the trade designation "SCOTCH 851" from 3M Company, St. Paul, MN), sticky side up. The sample strip of silicone coating was mounted onto the tape to hold it in place during testing. A fresh steel wool pad was mounted on the foot of the abrasion test instrument and the foot is lowered onto the silicone side of the test sample. The test foot is weighted to 1000 grams for testing. Once lowered, the foot is rubbed back and forth 5 times over the silicone sample, which is now called the rubbed sample (Sample B). Sample B is then measured using the X-ray fluorescence detector as described above. This measurement is recorded as rubbed (Sample B). The results are reported as % Rub Off, calculated as follows, $$\% \text{ Rub Off}=[1-(\text{Sample } B \text{ silicone weight})/(\text{Sample } A \text{ silicone weight})]\times 100\%$$

Three different sets (representing different conditioning protocols) of three silicone samples each, are measured for each coating, and % Rub Off is reported as the average result of the 3 test samples for each conditioning protocol. One set is measured immediately after coating, and the result is called Initial % Rub Off, another set of samples are placed in a Constant Temperature and Humidity Room (CTH), at 21° C. and 70% Relative Humidity (RH) for 7 days, prior to measuring % Rub Off. A third set of samples are placed in a 90/90 Environment: 90° F. (32° C.) and 90% RH for 7 days before being tested for % Rub Off.

For % Rub Off, a desirable % Rub Off is considered anything below 50%.

Liner Peel Procedure and Visual Whitening Test

Although not wanting to be bound by theory, it is believed that in commercial use as a delivery system for adhesives, the laminated articles made above would have the non-exemplary release film peeled off, the exposed adhesive would be applied to a surface such as an optical display part, and the Exemplary liner would then be peeled off, leaving the adhesive on the optical display part. To simulate this process, so as to be able to measure the haze and degree of whitening in commercial use of the exemplary liners of Examples 1-10, a controlled 180-degree peel was performed on the laminated articles. A peel tester (obtained under the trade designation "SP 2100" from Imass, Accord, MA) equipped with a 5.0 lbs. (2.27 kg) load cell was operated with the following parameters: a 1 inch (2.54 cm) wide test specimen, a peel rate of 90 in./min. (229 cm/min.), a one second delay before data acquisition, and a five second averaging time. The load cell was tared before starting a peel. Double sided masking tape (obtained under the trade designation "3M 410M," 3M Company, St. Paul, MN) was used to adhere a sample made above, with the silicone liner side up, to platen, and the primed silicone liner was attached to the peel arm. Then the platen was "Jogged" until the liner was taut and then the peel was begun.

Visual appearance was rated for whitening based on a visual rating scale from 1 to 3, where a 1 represented significant whitening, a 2 represented slight whitening, and a 3 represented no whitening. The most desirable rating is the 3 rating (i.e., no whitening of the liner after its peeling-mode removal from the PSA).

Test results for the visual whitening of Examples 1-6 are shown in Table 2, below.

TABLE 2

| Example | Polymer 1 | Polymer 2 | Ratio Polymer 1/ Polymer 2 | % Extractables | Initial % Ruboff | 7-day 21° C./70% RH % Ruboff | 7-day 32° C./90% RH % Ruboff | Whitening Test Rating |
|---|---|---|---|---|---|---|---|---|
| 1 | SulfoPET 1 | "EASTEK 1100" | 50/50 | 0.2 | 45.3 | 48.9 | 47.7 | 1 |
| 2 | SulfoPET 2 | NA | 100/0 | 0.2 | 57.1 | 40.3 | 51.4 | 1 |
| 3 | SulfoPEN 1 | NA | 100/0 | 0.1 | 39.7 | 49.9 | 44.1 | 3 |
| 4 | SulfoPET 3 | NA | 100/0 | 0.2 | 37.1 | 45.7 | 34.2 | 3 |
| 5 | SulfoPET 2 | "EASTEK 1100" | 50/50 | 0.3 | 21.5 | 21.4 | 16.7 | 1 |
| 6 | SulfoPEN 1 | "EASTEK 1100" | 50/50 | 0.3 | 29.3 | 22.6 | 20.1 | 3 |

Example 7

A coating solution was prepared as follows. A solution of 35.9 grams of water and 0.03 gram of surfactant ("DYNOL 607") was continuously stirred. To that was added 6.9 grams of sulfonated polyester aqueous dispersion ("EASTEK 1100"), 5.7 grams of self-crosslinking polyurethane ("TURBOSET 2027"), 0.2 gram of epoxy functional silane ("SILQUEST A-187"), 2.5 grams of melamine formaldehyde crosslinker ("CYMEL 327") (diluted to 20 wt. % solids with deionized (DI) water), and 0.3 gram of catalyst ("CYCAT 4045") (diluted to 10 wt. % solids with DI water).

Example 8

A coating solution was prepared as described in Example 7, except 4.6 grams of self-crosslinking polyacrylate ("AC 2314") was used in place of the self-crosslinking polyurethane ("TURBOSET 2027").

Example 9

A coating solution was prepared as follows. A solution of 37.6 grams of water and 0.03 gram of surfactant ("DYNOL 607") was continuously stirred. To that was added 7.4 grams of self-crosslinking polyurethane ("TURBOSET 2027"), 0.2 gram of epoxy functional silane ("SILQUEST A-187"), 2.5 grams of melamine formaldehyde crosslinker ("CYMEL 327") (diluted to 20 wt. % solids with DI water), and 0.3 gram of catalyst ("CYCAT 4045") 4045 (diluted to 10 wt. % solids with DI water).

Example 10

A coating solution was prepared as follows. A solution of 33.9 gram of water and 0.03 gram of surfactant ("DYNOL 607") was continuously stirred. To that was added 12.1 gram of sulfonated polyester aqueous dispersion ("EASTEK 1100"), 0.3 gram of epoxy functional silane ("SILQUEST A-187"), 2.7 gram of melamine formaldehyde crosslinker ("CYMEL 327") (diluted to 20 wt. % solids with DI water), and 0.4 gram catalyst ("CYCAT 4045") (diluted to 10 wt. % solids with DI water).

Example 11

A coating solution was prepared as follows. A solution of 49.5 gram of water with 0.5 gram of melamine formaldehyde crosslinker ("CYMEL 327") is continuously stirred. Although this solution was not used to construct an article described herein having the first polymeric film having first and second, opposed major surfaces; a first release layer Coating Method The coating solutions of Examples 7-10 were coated onto non-oriented, cast, 432 micrometer thick polyethylene terephthalate (PET) film made in-house by the usual extrusion techniques known to one of ordinary skill in the art using a coating rod (obtained under the trade designation "MAYER ROD, NO. 6" from RDS Specialties, Webster, NY). The coating of thickness ranged from 381-650 micrometers. The samples were dried in a lab batch electric oven (obtained under the trade designation "PROTOCOL PLUS" from Despatch Industries, Minneapolis, MN) set at 80° C. for 2 minutes. Samples were then loaded into a lab scale batch film stretching machine (obtained under the trade designation "KARO IV" from Bruckner Maschinenbau GmbH & Co. KG, Siegsdorf, Germany). The samples were pre-heated at 98° C. for 50 seconds, then simultaneously stretched to 3.6 times the unstretched dimension in the transverse direction and 1.8 times the unstretched dimension in the machine direction, followed by heating for 15 seconds at 215° C.

Primer coated stretch-oriented polyester films were coated with a silicone release formulation which is a mixture of a divinyl terminated silicone polymer ("VTSP"), and a hydride functional polysiloxane crosslinker ("HFSX"). The divinyl terminated silicone polymer ("VTSP") 100 parts by wt.) and hydride functional polysiloxane crosslinker ("HFSX") (2.54 parts by wt.) were mixed, yielding a hydride:vinyl ratio of 1.2:1, and the mixture was stirred to give a homogeneous solution. The silicone release formulation was coated onto the primed side of the test films made as described above, using a coating rod (obtained under the trade designation "MAYER ROD, NO. 5" from RDS Specialties, Webster, NY), and was then dried in an oven (obtained under the trade name "PROTOCOL 3" from Despatch Industries, Minneapolis, MN) set at 120° C. for 2 minutes. Samples were then stored at 22° C. and in 50% humidity for at least seven days.

Onto the silicone coated films, coatings of adhesive were prepared as described in Example 1, col. 14 lines 35-60, of U.S. Pat. No. 8,911,873 B2 (Suwa et al.), the disclosure of which is incorporated herein by reference, except that the primed and silicone coated films of these Examples were used as substrate films instead of the L substrate films under the trade designation "CERAPEE", the adhesive was notch bar coated to 130-170 micrometers thick, and the over-laminated release film was a plain, uncoated, biaxially oriented PET homopolymer film rather than the film under the trade designation "PUREX A-31." The laminated articles were stored for seven days at 22° C. and 50% relative humidity.

Formaldehyde Test

For Examples 7 to 11, the formaldehyde measurement was made with a formaldehyde meter (obtained under the trade designation "RIKEN FP-31(EX)" from Riken Keiki Co., Ltd., Tokyo, Japan). Within the first 60 minutes of preparing the solution in the Examples, the meter was held about 0-2 cm over a continuously stirring beaker of the composition to be tested at room temperature (20-24° C.). The measurement was made using the No. 008 tab for 1800 seconds (30 minutes) at 40-60% relative humidity.

Test results for the visual whitening of Examples 7-10 are shown in Table 3, below.

TABLE 3

| Example No. | Formaldehyde Test, ppm | Haze Measurement Test, % Haze | Surface Roughness Ra, (micrometers) | Visual Whitening Rating |
|---|---|---|---|---|
| 1 | <0.01 | 0.82 | 0.019 | 3 |
| 2 | <0.01 | 1.34 | 0.021 | 3 |
| 3 | <0.01 | 0.81 | 0.121 | 2 |
| 4 | 0.04 | — | — | 1 |
| 5 | 0.05 | — | — | — |

Haze Measurement Test

For Examples 7-11, haze measurements were made on the silicone liner peeled from the adhesive with a haze meter (obtained under the trade designation "HAZE-GARD PLUS" from BYK-Gardner, Columbia, MD). After pressing "Operate", the sample was held to the Haze-port, "Operate" was pressed again, sample was then held to the Clarity-port and "Operate" was pressed a third time. Haze values (% Haze) were recorded from the display. The values reported an average of 2-3 readings, in Table 3, above.

Surface Roughness Test

For Examples 7-11, using a 3D laser scanning microscope (obtained under the trade designation "VK-X200" from Keyence, Osaka, Japan), as a surface roughness evaluator, a sample was focused at 150× in "Laser" mode. The brightness was adjusted to just below the level where the pixels were maxed out and the settings selected are "Surface Profile" mode, "Standard" area, and "High Accuracy" quality. The RPD box was clicked and the measurement taken. In the MultiFileAnalyzer window, "Process Image", then "Reference Plane settings", then "Specify Area" were clicked, and the background was matched and subtracted. "Surface R", then "Add an area . . . " were clicked and the area was selected. The surface roughness recorded was the Ra value. The results are listed Table 3, above.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An article comprising, in order:
a first polymeric film having first and second, opposed major surfaces;
a first primer layer comprising (i) a sulfonated polyester that comprises a sulfonated polyethylene naphthalate, and (ii) a melamine-formaldehyde crosslinker, wherein the sulfonated polyester is present in a range from 0.1 to 70 weight percent, based on the total solids content of the uncured aqueous composition, and having first and second opposed, major surfaces on the first major surface of the first polymeric film, wherein for a distance of at least 25 nm starting from the first major surface of the first primer layer toward the second major surface of the first primer layer there is an average Si content, on a theoretical elemental basis, not greater than 15 atomic percent; and
a first release layer having first and second opposed, major surfaces, wherein the second major surface of the first release layer is in direct contact with the first major surface of the first primer layer, wherein the first release layer comprises, on a theoretical elemental basis, Si.

2. The article of claim 1, further comprising a first optically clear adhesive layer having first and second, opposed major surfaces on the first major surface of the first release layer.

3. The article of claim 2, wherein the first optically clear adhesive layer comprises a (meth)acrylate copolymer having pendant (meth)acryloyl groups and optionally pendant hydroxyl groups (e.g., compounded with a free-radical generating initiator), wherein the (meth)acrylate copolymer has a weight average molecular weight of 50,000 to 600,000 Daltons and an average molecular weight between (meth)acryloyl groups equal to at least 16,000 Daltons.

4. The article of claim 2, wherein if the first optically clear adhesive layer is peeled from the first major surface of the first release layer the first major surface of the first release layer exhibits a haze not greater than 10%.

5. The article of claim 2, wherein if the first optically clear adhesive layer is peeled from the first major surface of the first release layer, the first major surface of the first release layer has a surface roughness, $R_a$, not greater than 0.15 micrometer.

6. The article of claim 2, further comprising a second polymeric film having first and second, opposed major surfaces on the first release layer, wherein the article comprises in order, the first polymeric film, the first primer layer, the first release layer, the first optically clear layer, and the second polymeric film.

7. The article of claim 6, wherein the second polymeric film is one of a polyester, polypropylene, or polyethylene film.

8. The article of claim 1, wherein the first primer layer has a thickness in a range from 0.05 to 0.5 micrometer.

9. The article of claim 1, wherein the first release layer has a thickness of at least 0.02 micrometer.

10. The article of claim 1, wherein the first polymeric film is one of a polyester, polypropylene, or polyethylene film.

11. The article of claim 1, further comprising a second primer layer on the second major surface of the first polymeric film, the second primer layer having first and second, opposed major surfaces.

12. The article of claim 11, wherein for a distance of at least 25 nm starting from the second major surface of second primer layer toward the first major surface of the second primer layer there is an average Si content, on a theoretical elemental basis, not greater than 15 atomic percent.

13. The article of claim 11, further comprising a second release layer having first and second, opposed major surfaces, wherein the first major surface of the second release layer is in direct contact with the second major surface of the second primer layer.

14. The article of claim 13, wherein the second release layer comprises, on a theoretical elemental basis, Si.

15. An article comprising, in order:
a first polymeric film having first and second, opposed major surfaces;
a first primer layer comprising (i) a sulfonated polyester that is a reaction product of 5-sulfoisophthalic acid, at least one of sebacic acid and adipic acid, and at least one of ethylene glycol and neopentyl glycol, and (ii) a melamine-formaldehyde crosslinker, wherein the sulfonated polyester is present in a range from 0.1 to 70 weight percent, based on the total solids content of the uncured aqueous composition, and having first and second opposed, major surfaces on the first major surface of the first polymeric film, wherein for a distance of at least 25 nm starting from the first major surface of the first primer layer toward the second major surface of the first primer layer there is an average Si content, on a theoretical elemental basis, not greater than 15 atomic percent; and
a first release layer having first and second opposed, major surfaces, wherein the second major surface of the first release layer is in direct contact with the first major surface of the first primer layer, wherein the first release layer comprises, on a theoretical elemental basis, Si.

16. The article of claim 15, further comprising a first optically clear adhesive layer having first and second, opposed major surfaces on the first major surface of the first release layer.

17. The article of claim 16, wherein the first optically clear adhesive layer comprises a (meth)acrylate copolymer having pendant (meth)acryloyl groups and optionally pendant hydroxyl groups (e.g., compounded with a free-radical generating initiator), wherein the (meth)acrylate copolymer has a weight average molecular weight of 50,000 to 600,000 Daltons and an average molecular weight between (meth)acryloyl groups equal to at least 16,000 Daltons.

18. The article of claim 16, wherein if the first optically clear adhesive layer is peeled from the first major surface of the first release layer the first major surface of the first release layer exhibits a haze not greater than 10%.

19. The article of claim 16, wherein if the first optically clear adhesive layer is peeled from the first major surface of the first release layer, the first major surface of the first release layer has a surface roughness, $R_a$, not greater than 0.15 micrometer.

20. The article of claim 1, wherein the first primer layer has a thickness in a range from 0.05 to 0.5 micrometers.

* * * * *